Oct. 18, 1966  D. ZURIT ETAL  3,279,493
VALVE ASSEMBLY FOR KEGS
Filed Dec. 26, 1963
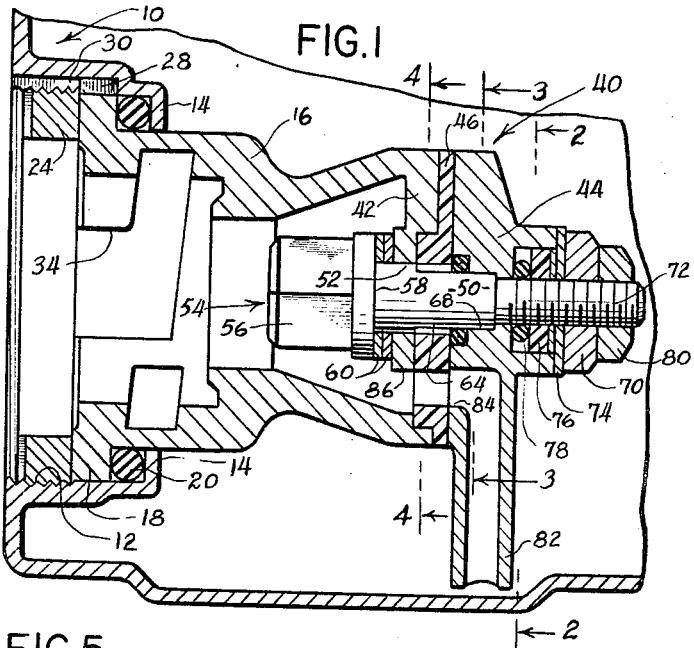
FIG.1
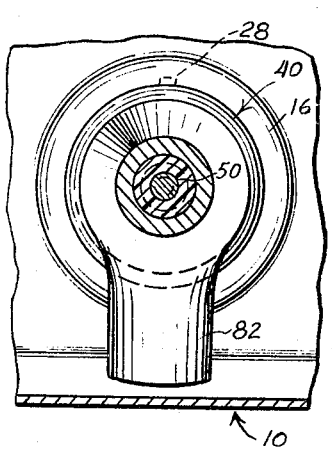
FIG.2
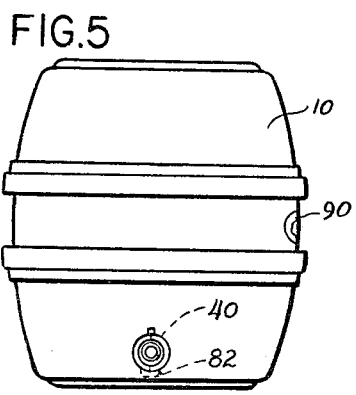
FIG.5
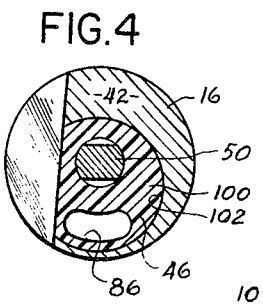
FIG.4
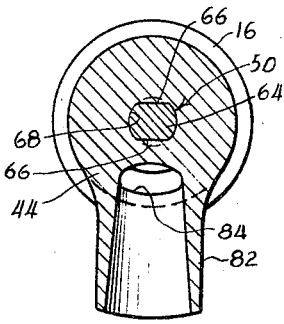
FIG.3
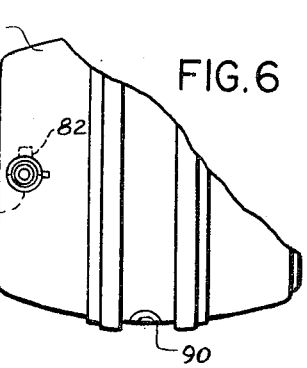
FIG.6
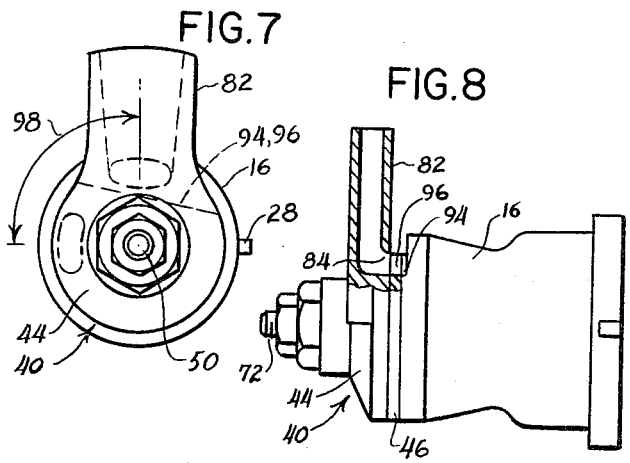
FIG.7
FIG.8
INVENTORS
David Zurit
Michael P. Parisi
BY Emery, Whittemore,
Sandoe & Graham
ATTORNEYS

3,279,493
VALVE ASSEMBLY FOR KEGS
David Zurit, Teaneck, and Michael J. Parisi, Paramus, N.J., assignors to Tap-Rite Products Corp., Hackensack, N.J., a corporation of New Jersey
Filed Dec. 26, 1963, Ser. No. 333,423
11 Claims. (Cl. 137—323)

This invention relates to apparatus for tapping liquid-containing vessels, such as beer kegs. The invention will be described as embodied in beer-tapping apparatus, but some features are not so limited within the scope of the appended claims. More particularly, the invention relates to apparatus that fits into the tapping hole of a keg and that has a valve which seals the opening when in one position and which leaves the interior of the keg in communication with a beer line or faucet when in another position.

It is an object of the invention to provide tapping apparatus of the character indicated with an improved vertically extending inlet that can be made long enough for withdrawing the contents of the keg down to the last few ounces of liquid within the keg.

It is a more specific object of the invention to provide a valve of the character indicated with an inlet fitting that turns with the valve and that moves into a position where it is exposed to the free flow of cleaning fluid in the keg when the valve is closed and the keg is in position for washing.

It is another object of the invention to provide an improved valve construction with a static sealing disk having a novel structure for preventing rotation of the seal and having a shape that forms with the other parts of the apparatus a channel for unobstructed drainage of cleaning fluid from the inlet fitting of the value.

Other objects, feautres and advantages of the invention will appear or be pointed out as the description proceeds.

In the drawing, forming a part hereof, in which like reference characters indicate corresponding parts in all the views:

FIGURE 1 is a sectional view showing the tapping apparatus of this invention in assembled relation with a beer keg;

FIGURES 2, 3 and 4 are sectional views taken on the lines 2—2, 3—3 and 4—4, respectively, of FIGURE 1;

FIGURE 5 is a diagrammatic, reduced-scale view showing the position of a beer keg when this invention is being used for withdrawing liquid from the keg;

FIGURE 6 is a view similar to FIGURE 5 but showing the position occupied by the beer keg when being washed;

FIGURE 7 is an end view of the apparatus shown in FIGURE 1 but with the valve closed and the apparatus in the orientation which it has during the washing of the keg; and FIGURE 8 is a side elevation, partly broken away, of the structure shown in FIGURE 7.

FIGURE 1 shows a conventional beer keg 10 having a tapping opening 12 which is formed with a flange 14. The tapping apparatus of this invention includes a body 16 having a flange 18. A sealing element, such as an O-ring 20, is placed against the flange 14, and the body 16, with its associated structure, is pushed into the opening 12 until the flange 18 comes against the O-ring 20. A ring 24 is then screwed into a threaded portion of the opening 12, and this ring 24 clamps the flange 18 against the O-ring 20 and the keg flange 14.

There is a key 28 on the body 16 and this key fits into a keyway 30 in the opening 12 so that the body 16 can be oriented in only one position when assembled with the keg 10.

The outer end of the body 16 (the lefthand end in FIGURE 1) has a bayonet-type groove 34 for receiving the stem of a faucet or other fitting through which beer is to be withdrawn from the keg. There is also a valve at the inner end (the right-hand end in FIGURE 1) of the body 16. This valve, indicated generally by the reference character 40, includes an end wall 42 of the body 16, an inlet fitting 44 which overlies the outside of the end wall 42, and a static seal 46 located between the end wall 42 and the inlet fitting 44. In broadly defining the invention, this seal 46 may be considered a composite part of the end wall 42.

The snorkel fitting 44 is held in assembled relation with the static seal 46 and the end wall 42 by a bolt 50 extending through a circular bearing 52 in the end wall 42 and static seal 46. The bolt 50 has a head 54 with a diamond-shaped portion 56 for receiving the end of a socket wrench for turning the bolt 50. The head 54 includes also a shoulder 58 which bears against thrust washers 60 which, in turn, bear against an area of the inside face of the end wall 42.

The bolt 50 has a section 64, best shown in FIGURE 3, with flats 66 that pass through an opening 68 in the inlet fitting 44. This opening 68 is of a cross section similar to the section 64 of the bolt so that rotation of the bolt causes the inlet fitting 44 to rotate as a unit with the bolt to open and close the valve 40, as will be explained. There is a nut 70 screwed over a threaded end 72 of the bolt 50. This nut 70 clamps a gland 74 against packing 76 located in a counterbore in the outside face of the inlet fitting 44.

The packing 76 preferably includes an O-ring 78 in the lower part of the counterbore, and the nut 70 is tightened to obtain the desired pressure on the packing 76 and is then tightened further to obtain sufficient friction between the inlet fitting 44 and the static seal 46 to prevent accidental rotation of the bolt 50 and inlet fitting 44 as a result of vibration or impact with the outside of the keg. The nut 70 is held in any adjusted position by a jamb nut 80.

An inlet conduit 82 extends radially from the fitting 44 and communicates with an opening 84 through the inner face of the fitting 44. This opening 84 registers with a complentary opening 86, in the end wall 42, when the valve 40 is in open position, as shown in FIGURE 1.

With the parts in the positions shown in FIGURE 1, liquid in the keg 10 is forced up through the inlet conduit 82, and through the openings 84 and 86 into the interior of the body 16 through which the liquid flows to the faucet or other fitting which is inserted into the open end of the body 16.

When the keg 10 is in upright position, as shown in FIGURES 1 and 5, and the valve 40 is open, the inlet conduit 82 extends downward very close to the lowest part of the bottom of the keg so that substantially all of the liquid in the keg can be withdrawn.

When the keg 10 is to be washed, it is turned over on its side, as shown in FIGURE 6. There is a bung opening 90 in the side of the keg 10 and the keg is washed by placing it with the opening 90 lowermost and inserting a nozzle into the keg through the bung opening to discharge a strong spray of cleaning fluid inside the keg.

Before washing the keg, the valve 40 is closed and this causes the inlet conduit 82 to turn clockwise through an angle of 90° into the position shown in FIGURE 6. Thus the closing of the valve 40 orientates the inlet conduit 82 so that it extends vertically upward when the keg is in washing position, as in FIGURE 6. Some of the cleaning fluid sprayed into the interior of the keg 10 falls into the open upper end of the inlet conduit 82 and drains freely through the inlet conduit as a result of structure which will be explained in connection with FIGURES 7 and 8.

The provision for draining cleaning fluid from the inlet conduit is illustrated in FIGURES 4, 7 and 8. The outside face of the end wall 42 is of reduced thickness beyond a shoulder 94. There is a similar shoulder 96 on the static seal 46. When the inlet fitting 44 turns clockwise 90° from the position which puts the opening 84 in register with the opening 86, the opening 84 moves beyond the shoulders 94 and 96 into the position shown in FIGURE 7. This 90° angular movement is indicated by the dimension line 98. With the inlet conduit 82 so positioned, cleaning fluid inside the inlet conduit runs out freely through the opening 84 and into the channel provided between the inlet conduit 82 and the outside surface of the end wall 42. This channel is clearly shown in FIGURE 8. The shoulders 94 and 96 form the bottom of the channel and they slope downwardly toward the right (in FIGURE 7) so that the cleaning fluid drains rapidly from the end of the channel.

In order to keep the opening 86 through the static seal 46 always in register with the portion of the opening 86 that opens through the end wall 42, provision is made for preventing rotation of the static seal 46 around the bolt 50. This is best illustrated in FIGURE 4 which shows an inner portion 100 of the static seal 46 extending into an eccentric recess 102 in the outside surface of the end wall 42. Because of the eccentricity of this recess 102 with respect to the bolt 50, the static seal cannot rotate about the bolt. The recess 102 and the inner portion 100 of the static seal are preferably circular, since this is the most convenient shape to manufacture, but they are cut off at the shoulders 94 and 96 to increase the depth of the channel.

All parts of the tapping apparatus of this invention are preferably made of metal which is not corroded by beer or other liquid with which it is intended to be used, except the packing and the static seal 46. The latter is preferably made of polytetrafluoroethylene.

The preferred embodiment of the invention has been illustrated and described, but changes and modifications can be made and some features can be used in different combinations without departing from the invention as defined in the claims.

What is claimed is:

1. A beer keg valve including in combination a stationary housing with means for connecting it with an outlet opening in one side of a keg, the housing having an integral end wall and a fluid flow passage through the end wall at an eccentric location of the wall, an inlet fitting outside of the end wall and movable angularly about an axis of the end wall and having a face that confronts the end wall and a passage extending through said face of the inlet fitting and that moves along an arc into and out of register with the passage through the end wall to open and close said valve, said inlet fitting including a radially extending inlet conduit forming the inlet end of the passage in the inlet fitting, the end wall being spaced from the face of the inlet fitting throughout a region that includes a substantial arc of the circumference of the valve and that extends radially inward across the end of the arc of movement of the inlet-fitting passage which the inlet fitting passage occupies when the valve is closed, whereby the passage of the inlet fitting communicates through said region with the space outside of the circumference of the valve when the valve is closed.

2. The beer keg valve described in claim 1 characterized by a shaft secured to the inlet fitting and rotatable in the end wall of the housing as a bearing and having an end within the housing shaped to receive an implement for turning the shaft to open and close the valve, said shaft holding the inlet fitting against the face of the end wall of the housing, the confronting faces of the inlet fitting and the end wall providing contacting bearing surfaces on which the inlet fitting moves angularly about the axis of the shaft to open and close the valve, at least one of said confronting faces having its bearing surface terminating at a shoulder to leave the space between said confronting faces at said region, the shoulder forming, with portions of the confronting faces, a drainage channel for cleaning fluid in the passage of the inlet fitting when the inlet conduit is extending upwardly and the valve is closed.

3. The beer keg valve described in claim 2 characterized by the end face of the housing being the face that has the bearing surface which terminates at the shoulder, and said shoulder extending in a direction at a slope to the horizontal when the inlet fitting is moved into a closed position and the valve is oriented with the passage of the inlet fitting extending vertically upward.

4. The beer keg valve described in claim 3 characterized by a beer keg with which the beer keg valve is connected, the beer keg having a bung opening which is placed lowermost when the keg is being washed, the bung and the valve being located in the peripheral wall of the keg at axially spaced locations along the keg but being angularly-spaced approximately 90° from one another around the circumference of the keg, and the inlet conduit projecting vertically upward when the valve is closed and the keg is oriented with the bung lowermost for receiving cleaning fluid.

5. The beer keg valve described in claim 2 characterized by the end face of the housing including a static covering thereon that comprises a static sealing element which extends over the entire bearing surface areas of the confronting faces of the housing and the inlet fitting, and the static sealing element having an opening therethrough in register with the passage through the part of the end wall behind the static sealing element and having means for preventing angular movement of the static sealing element about the axis of said shaft.

6. The beer keg valve described in claim 5 characterized by the static sealing element having a protuberance on its face that is remote from the inlet fitting, and the part of the end wall of the housing behind said protuberance being recessed to receive the protuberance, the recess having a side wall that acts as a stop to prevent angular movement of the static sealing element.

7. The beer keg valve described in claim 6 characterized by the side wall of the recess being an arc of a circle but the center of the curvature of the arc being spaced from the axis of the shaft, the sealing element being made of polytetrafluoroethylene, and the shaft extending through and beyond the inlet fitting and having a threaded end with a nut thereon for holding the bearing surface of the inlet fitting against the static sealing element with adjustable pressure for controlling the friction of the valve.

8. The beer keg valve described in claim 1 characterized by at least a portion of the outside face of the end wall of the housing being made of sealing material that is held against the other part of the end wall behind it and in static relation thereto, and the sealing material having a passage therethrough in register with the opening through the part of the end wall behind the sealing material.

9. A valve for a keg including a housing with means for connecting it with an outlet of a keg, the housing having an end wall with a face and a fluid flow passage through the face of the end wall at an eccentric location of the wall, a fitting outside of the end wall and movable angularly amout an axis of the valve and having a face that confronts the face of the end wall, a passage extending through the fitting and the face of said fitting and that moves along an arc into and out of register with the passage through the end wall to open and close the valve, the end wall having a sealing disc thereon between the faces of the housing and the fitting and having an opening therethrough in register with the opening through the housing, and means holding the disc against rotation with respect to the housing the disc having a gap that includes a substantial arc of the circumference of the disc and that extends radially inward across the end of the arc occupied by the opening through the fitting when the fitting is in its valve-closing position.

10. A valve construction having a valve body with an end face having a disc of polytetrafluoroethylene overlying the end face of the valve body and held against rotation with respect to the end face of the valve body, a fluid passage opening through the disc and the end face, a fitting having a face that confronts the disc, means clamping the fitting against the disc including a bearing on which the fitting has angular movement about an axis through the disc and between valve-open and valve-closed positions, a fluid passage through the fitting and movable along an arc as the fitting moves angularly about said axis, the passage through the fitting, when, at one end of said arc, being in register with the passage through the disc and the valve being open, the disc having a discontinuity that includes a substantial arc of the circumference of the disc and that extends radially inward across the end of the arc at which the passage through the fitting is located when the fitting is in valve-closing position, the surface of the fitting that confronts the polytetrafluoroethylene when in valve-closing position being continuous.

11. The valve described in claim 10 characterized by the clamping means being adjustable to regulate the pressure of the fitting against the polytetrafluoroethylene.

References Cited by the Examiner
UNITED STATES PATENTS

| | | | |
|---|---|---|---|
| 2,545,620 | 3/1951 | Lamoureux | 137—323 |
| 2,992,654 | 8/1961 | Doremus et al. | 137—323 |
| 3,115,149 | 12/1963 | Tonna et al. | 137—323 |
| 3,115,150 | 12/1963 | Sariotti et al. | 137—323 |

WILLIAM F. O'DEA, *Primary Examiner.*

ISADOR WEIL, *Examiner.*

D. MATTHEWS, *Assistant Examiner.*